United States Patent
Nishikawa et al.

(10) Patent No.: US 10,982,719 B2
(45) Date of Patent: Apr. 20, 2021

(54) SEAL FIN, SEAL STRUCTURE, AND TURBO MACHINE

(71) Applicant: MITSUBISHI HITACHI POWER SYSTEMS, LTD., Yokohama (JP)

(72) Inventors: Toyoharu Nishikawa, Tokyo (JP); Yoshihiro Kuwamura, Tokyo (JP); Hiroharu Oyama, Yokohama (JP); Katsuhisa Hamada, Yokohama (JP); Hideaki Sugishita, Tokyo (JP)

(73) Assignee: MITSUBISHI POWER, LTD., Yokohama (JP)

( * ) Notice: Subject to any disclaimer, the term of this patent is extended or adjusted under 35 U.S.C. 154(b) by 152 days.

(21) Appl. No.: 15/780,781

(22) PCT Filed: Nov. 28, 2016

(86) PCT No.: PCT/JP2016/085177
§ 371 (c)(1),
(2) Date: Jun. 1, 2018

(87) PCT Pub. No.: WO2017/098944
PCT Pub. Date: Jun. 15, 2017

(65) Prior Publication Data
US 2018/0372158 A1      Dec. 27, 2018

(30) Foreign Application Priority Data

Dec. 9, 2015   (JP) .................................. 2015-240489

(51) Int. Cl.
| *F16C 33/80* | (2006.01) |
| *F01D 11/08* | (2006.01) |
| *F16J 15/447* | (2006.01) |
| *F01D 11/02* | (2006.01) |
| *F01D 11/20* | (2006.01) |
| *F02C 7/28* | (2006.01) |

(52) U.S. Cl.
CPC .............. *F16C 33/80* (2013.01); *F01D 11/02* (2013.01); *F01D 11/08* (2013.01); *F01D 11/20* (2013.01);
(Continued)

(58) Field of Classification Search
CPC .......... F01D 11/02; F01D 11/08; F01D 11/20; F16C 33/80; F02C 7/28; F16J 15/447;
(Continued)

(56) References Cited

U.S. PATENT DOCUMENTS 1,756,958 A * 5/1930 Schmidt .................. F01D 11/02
                                                    415/131
3,251,601 A * 5/1966 Harvey .................... F01D 11/08
                                                    277/424
(Continued)

FOREIGN PATENT DOCUMENTS

DE     10 2007 004 743 A1    8/2008
JP         H02-245581 A     10/1990
(Continued)

OTHER PUBLICATIONS

Office Action dated Sep. 17, 2019, issued in counterpart KR Application No. 10-2018-7015326, with English translation. (9 pages).
(Continued)

*Primary Examiner* — Eugene G Byrd
(74) *Attorney, Agent, or Firm* — Westerman, Hattori, Daniels & Adrian, LLP (57) ABSTRACT

There are provided a seal fin, a seal structure, and a turbo machine that can achieve a high leak-suppressing effect and can reduce leak loss of the turbo machine. The disclosure suppresses leak of a fluid from a gap between a first structure being in a static state and a second structure rotating around an axis line and is formed on the first structure so as to
(Continued)

extend toward the second structure while keeping a clearance between a tip face thereof on an extending direction and the second structure. The first structure and the second structure face each other in a radius direction with the gap inbetween. A plurality of hollows opening at a tip on the extending direction are arranged along a circumference direction in parallel with each other on a front face facing an upstream side of a flow direction of the fluid.

13 Claims, 4 Drawing Sheets (52) U.S. Cl.
CPC ............... *F02C 7/28* (2013.01); *F16J 15/447* (2013.01); *F16J 15/4472* (2013.01); F05D 2220/31 (2013.01); F05D 2230/14 (2013.01); F05D 2240/11 (2013.01); F05D 2240/126 (2013.01); F05D 2250/182 (2013.01); F05D 2250/294 (2013.01)

(58) Field of Classification Search
CPC ............ F16J 15/4472; F05D 2240/126; F05D 2250/182; F05D 2250/294
See application file for complete search history.

(56) References Cited

U.S. PATENT DOCUMENTS

| | | | |
|---|---|---|---|
| 4,351,532 A * | 9/1982 | Laverty | F16J 15/4472 277/419 |
| 5,029,876 A | 7/1991 | Orlando et al. | |
| 5,222,742 A * | 6/1993 | Roberts | F01D 11/02 277/420 |
| 5,298,016 A * | 3/1994 | Gordon | A61M 1/0281 210/645 |
| 6,139,018 A * | 10/2000 | Cromer | F16J 15/442 277/355 |
| 6,843,482 B1 * | 1/2005 | Bayne | F16J 15/002 277/412 |
| 7,445,213 B1 * | 11/2008 | Pelfrey | F01D 11/02 277/418 |
| 8,591,181 B2 * | 11/2013 | Kasibhotla | F01D 9/02 415/173.5 |
| 2009/0072487 A1 | 3/2009 | Chougule et al. | |
| 2013/0129493 A1 | 5/2013 | Matsumoto et al. | |
| 2013/0149118 A1 | 6/2013 | Lotfi et al. | |
| 2014/0294571 A1 | 10/2014 | Hillier | |
| 2016/0341058 A1 * | 11/2016 | Nishikawa | F01D 9/02 |

FOREIGN PATENT DOCUMENTS

| | | | | |
|---|---|---|---|---|
| JP | 2008-196522 A | | 8/2008 | |
| JP | 4598583 B2 | | 12/2010 | |
| JP | 2011208602 A | * | 10/2011 | ............ F01D 5/225 |
| JP | 2013-19537 A | | 1/2013 | |
| JP | 5709447 B2 | | 4/2015 | |

OTHER PUBLICATIONS

Office Action dated Oct. 30, 2019, issued in counterpart IN Application No. 201817020351, with English translation. (6 pages).
Office action dated Jun. 19, 2019, issued in counterpart KR application No. 10-2018-7015326, with English translation. (7 pages).

* cited by examiner

SEAL FIN, SEAL STRUCTURE, AND TURBO MACHINE

TECHNICAL FIELD

The present invention relates to a seal fin, a seal structure, and a turbo machine that suppress leak of a fluid from the space between two structures rotating relative to each other.

BACKGROUND

In a turbo machine such as a steam turbine, a gas turbine, or a turbo compressor, possible leak of an operation fluid such as steam from a gap between a stationary side and a rotating side causes a loss (leak loss) of the efficiency in the turbo machine. With the foregoing problem in view, a turbo machine uses a non-contact seal structure such as a labyrinth seal to avoid leak of an operation fluid.

Patent Literatures 1 and 2 disclose techniques related to a non-contact seal structure for a turbo machine. Hereinafter, description will now be made in relation to techniques disclosed in Patent Literatures 1 and 2. In the description, the reference signs used in Patent Literatures 1 and 2 are indicated in brackets.

Patent literature 1 discloses "a seal device that seals the space between a stationary body (11) and a rotating body (12) and that includes: a fin (13) protruding from the stationary body (11) toward the surface (12a) of the rotating body (12) and having a sharp tip; and a coarse face section (17) formed on the surface (12a) of the rotating body (12)" (see the front page, paragraph [0021], and FIGS. 1 and 2). According to Patent Literature 1, the coarse face section (17) disturbs flow surrounding the fin (13), so that the pressure loss of the fluid (14) is increased and an amount of the fluid (14) that leaks from the space between the fin (13) and the rotating body (12) can be reduced.

Patent Literature 2 discloses "a seal device including, in a labyrinth seal (28) that seals the space between the stationary body and the rotating body, a restriction ring (32) and a deflector means (36) arranged on a downstream of the restriction ring (32)" (see the front page, lines 15-30 in column 3, and FIGS. 1-5). The restriction ring (32) is formed so as to protrude from the platform (30) of the rotor assembly (10) toward the seal face (34) on the tip of the vane (24). The deflector means (36) is formed so as to protrude from the seal face (34) toward the platform (30) in contrast to the restriction ring (32).

According to Patent Literature 2, the operation fluid leaking from the first throttle opening (38) between the restriction ring (32) and the seal face (34) is deflected by the deflector means (36) and is therefore can be prevented from further leaking from the second throttle opening (40) between the deflector means (36) and the plat form (30).

PRIOR ART REFERENCE

Patent Literature

[Patent Literature 1] Japanese Laid-Open Patent Publication No. 2008-196522
[Patent Literature 2] U.S. Pat. No. 4,351,532 SUMMARY

Problems to be Solved by Invention

Unfortunately, the seal device disclosed in Patent Literature 1 does not have satisfactory leak-suppressing effect or leak loss suppressing effect of a turbo machine. This is because the fin (13) protruding toward the rotating body (12) contracts the flow of the fluid (14) in the radius direction, so that the leak flow, i.e., the flow of the fluid (14) proceeding in the axis direction between the fin (13) and the rotating body (12), is merely weakened to suppress the leak and consequently, the leak cannot be fully suppressed.

The seal device disclosed in Patent Literature 2 forms a first throttle opening (38) and the second throttle opening (40) by providing the restriction ring (32) and the deflector means (36) only to contract the flow of the fluid in the radius direction and therefore the leak is not sufficiently inhibited likewise the Patent Literature 1.

With the foregoing problems in view, the object of the present invention is to provide a seal fin, a seal structure, and a turbo machine that can ensure high leak-suppressing effect and can reduce the leak loss of the turbo machine.

Means to Solve the Problem (1) To attain the above object, a seal fin that suppresses leak of a fluid from a gap between a first structure being in a static state and a second structure rotating around an axis line and that is formed on the first structure so as to extend toward the second structure while keeping a clearance between a tip face thereof on an extending direction and the second structure, the first structure and the second structure facing each other in a radius direction with the gap inbetween, the seal fin comprising: a plurality of hollows opening at a tip on the extending direction and being arranged along a circumference direction in parallel with each other on a front face facing an upstream side of a flow direction of the fluid.

(2) The hollows are preferably formed into a curved shape that comes to be a posture following along the circumference direction as approaching the tip.

(3) The curved shape preferably comes to be a posture following along a rotating direction of the second structure as approaching the tip.

(4) The hollows are preferably formed so as to be inclined with respect to the radius direction.

(5) The hollows are preferably inclined toward a downstream side of a rotating direction of the second structure as approaching the tip.

(6) The hollows preferably have a transversal section perpendicular to a flow direction of the fluid flowing in the hollows, the transversal section being formed into a tapered shape that narrows as approaching the tip.

(7) It is preferable that: a thickness dimension of the seal fin along the axis line at a portion not having the hollows is regarded as a standard dimension; a depth dimension of the hollows along the axis line is set to be 0.8 times the standard dimension or less; a dimension of the hollows along a width-direction at an edge on an outer side of the radius direction is set to be 10 times the standard dimension or less, the width-direction being orthogonal to the radius direction; a height dimension of the hollows along the radius direction is set to be 20 times the standard dimension or less; and a distance between the hollows adjacent to each other in the circumference direction is set to be 100 times the standard dimension or less.

(8) To attain the above object, a seal structure of the present invention that suppresses leak of a fluid from a gap between a first structure being in a static state and a second structure rotating around an axis line, the first structure and the second structure facing each other in a radius direction with the gap inbetween, the seal structure including: the seal fin being defined in one of above (1)-(7) and being formed on the first structure so as to extend toward the second structure while keeping a clearance between a tip face thereof on an extending direction and the second structure.

(9) To attain the above object, the turbo machine of the present invention is characterized by including the seal structure defined in above (8).

Effect of Invention

According to the present invention, the hollows opening at the tip on the extending direction of the seal fin are arranged along the circumference direction in parallel with each other on the front face of the seal fin, which front face faces the upstream side of the flow direction of the fluid. The fluid flowing through the hollows is accelerated by the constriction effect, so that the hydrostatic pressure of the fluid lowers. Accordingly, the velocity component of the flow of the fluid in the direction of passing through the seal fin is weakened and consequently a leak amount of the fluid can be reduced (i.e., high leak-suppressing effect can be obtained).

Providing hollows forms thinner portions on the seal fin, and consequently the leak-suppressing effect can be obtained due to the thinner portions.

The presence of the seal fin having a high leak-suppressing effect can reduce the leak loss of the turbo machine.

BRIEF DESCRIPTION OF DRAWINGS

FIGS. 4A and 4B are schematic diagrams illustrating hollows of the seal fin according to an embodiment of the present invention; FIG. 4A being a front view and FIG. 4B being an isometric view.

EMBODIMENTS TO CARRY OUT INVENTION

Hereinafter, description will now be made in relation to an embodiment of the present invention with reference to the accompanying drawings.

In the present invention, the description is made in relation to an example that applies the seal fin, the seal structure, and the turbo machine of the present invention to a steam turbine.

The following embodiments are exemplary and do not intend to exclude various modification and application of technique not explicitly described in the following embodiments. The structures of the embodiments can be modified without departing from the scope of the embodiments, can be selected and omitted if required, and can be appropriately combined.

Figure 1:
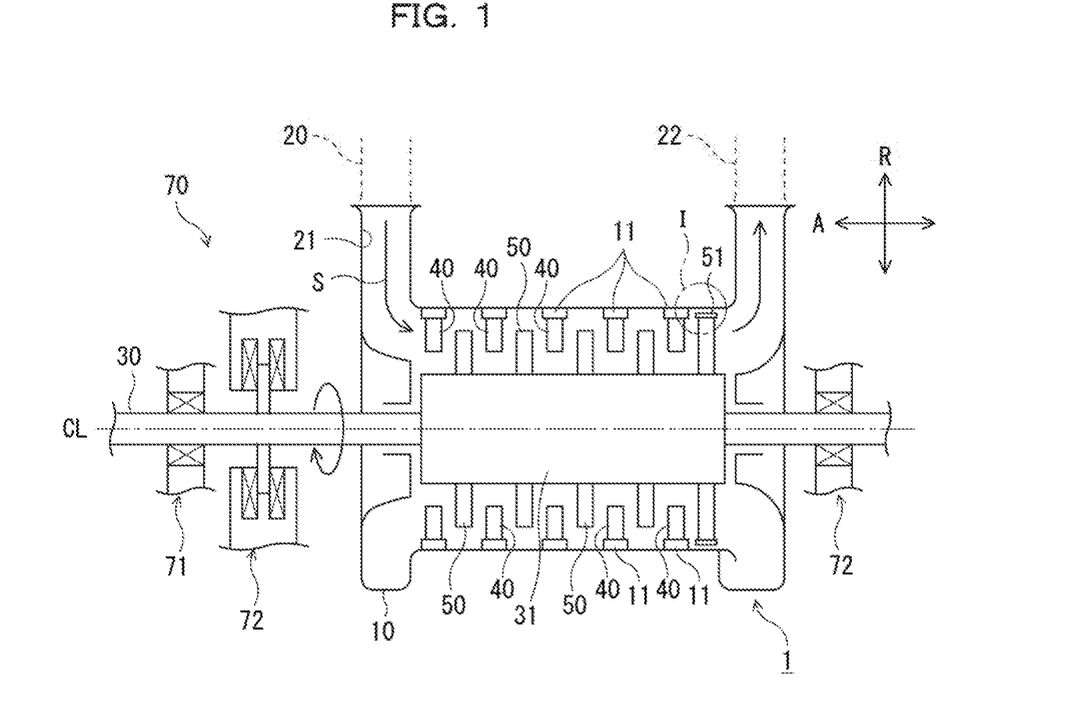
FIG. 1 is a schematic longitudinal sectional view illustrating the entire structure of a steam turbine according to an embodiment of the present invention.
Figure 2:
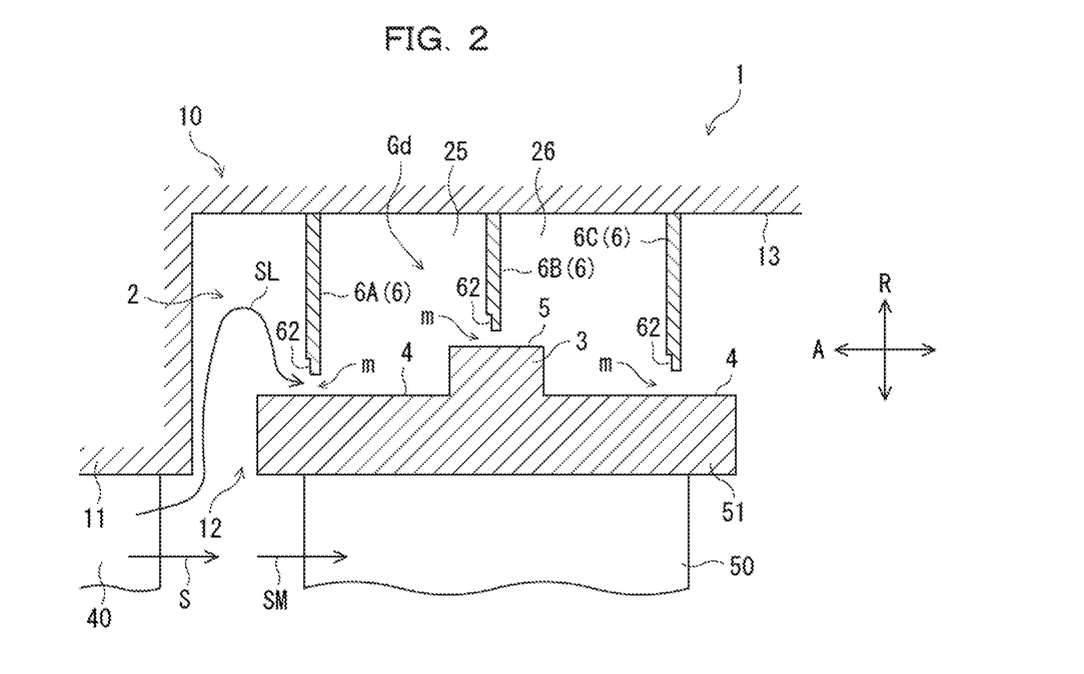
FIG. 2 is a sectional view of a main part of the steam turbine according to an embodiment of the present invention, specifically an enlarged sectional view of the part I of FIG. 1.

In the following description, the terms "upstream" and "downstream" respectively mean the upstream and the downstream with respect to the flow of steam S in the steam turbine unless otherwise specified. In other words, the left side in FIGS. 1 and 2 is regarded as the upstream side and the right side in the same drawings is regarded as the downstream side.

In the description, the direction toward the axis line CL of the steam turbine is regarded as the inner circumference side or inside, and the opposite side, the direction departing from the axis line CL is regarded as the outer circumference side or outside.

The circumference direction in the present invention includes, on the assumption that the rotating direction of a rotating shaft 30 to be detailed below is a forward direction, both the forward direction and the reverse direction.

1. Overall Configuration of Steam Turbine

As illustrated in FIG. 1, the steam turbine 1 (turbo machine) of the present embodiment is formed of a casing (first structure) 10, a rotating shaft 30 that is rotatably provided inside the casing 10 and that transmits power to a non-illustrated machine such as a generator, stationary vanes 40 provided to the casing 10, rotating vanes 50 provided to the rotating shaft 30, and a bearing 70 that supports the rotating shaft 30 so as to allow the rotating shaft 30 to rotate around the axis line CL. The stationary vanes 40 and the rotating vanes 50 are blades extending in the radius direction R of the rotating shaft 30.

The casing 10 is immobile while the rotating vanes 50 rotate around the axis line CL. This means that the casing 10 and the rotating vanes 50 (including a shroud 51 to be detailed below) rotate relative to each other.

The steam (fluid) S is introduced from a main inlet 21 formed on the casing 10 via a steam supplying pipe 20 connected to a non-illustrated steam providing source and is exhausted from a steam exhausting pipe 22 connected to the downstream side of the steam turbine.

The inner space of the casing 10 is airtightly sealed and serves as the flow path of the steam S. On the inner wall of the casing 10, partition-plate outer rings 11 each in a form of a ring through which the rotating shaft 30 is placed are rigidly fixed.

The bearing 70 includes a journal bearing device 71 and thrust bearing devices 72 and rotatably supports the rotating shaft 30.

A large number of stationary vanes 40 each extend toward the inner circumference from the casing 10, are radially arranged around the rotating shaft 30 to constitute a circular stationary vane group, and are each retained by the partition-plate outer ring 11 described above.

Multiple circular stationary vane groups each including multiple stationary vanes 40 are arranged along the axis direction A of the rotating shaft 30 (hereinafter, simply referred to as the axis direction) at intervals. Each circular stationary vane group converts the pressure energy of the steam S into the velocity energy and lets the steam S having increased velocity energy flow into the rotating vanes 50 adjacent to the circular stationary vane group on the downstream side.

The rotating vanes 50 are rigidly installed on the outer circumference of the shaft main body 31 of the rotating shaft 30. A large number of rotating vanes 50 are radially arranged downstream of each circular stationary vane group to constitute a circular rotating vane group.

A pair of a circular stationary vane group and a circular rotating vane group is regarded as a single stage. In the rotating vane group of the last stage, the tips of the rotating vanes 50 neighboring in the circumference direction of the rotating shaft 30 (hereinafter, simply referred to as the circumference direction) are coupled to each other by a ring-form shroud (second structure) 51. Alternatively, the shroud 51 may be applied to another rotating group(s) and/or a stationary vane group(s) in addition to the rotatable vane group of the last stage.

2. Seal Structure 2-1. Overall Configuration of the Seal Structure

As illustrated in FIG. 2, at the downstream side of the partition-plate outer ring 11 in the axis direction, a groove (hereinafter, an annular groove) 12 in the form of a circular ring is formed, which has a radius widened from the partition-plate outer ring 11 and the base face 13 (hereinafter also referred to as a casing base face) in the inner circumference face of the casing 10. The annular groove 12 accommodates the shroud 51 and the casing base face 13 is opposed to the shroud 51 via a gap Gd in the radius direction R.

Steam MS composing the most part of the steam A flows into the rotating vanes 50 and the energy of the steam MS is converted into rotational energy, which consequently rotates the rotating shaft 30. In contrast, steam (hereinafter leak steam) SL composing part (e.g., several percent) of the steam S does not flow into the rotating vanes 50 and leaks into the annular groove 12. Since the energy that the leak steam SL possess is not converted into the rotational energy, the leak steam SL may cause leak loss that degrades the efficiency of the steam turbine 1.

Considering the above, a seal structure (step-type labyrinth seal) 2 according to an embodiment is provided at the gap Gd between the casing 10 and the rotating vanes 50. Hereinafter, description will now be made in relation to the seal structure 2.

The shroud 51 includes a step portion 3 having a center portion in the axis direction A protruding to be formed into a step shape. Specifically, a face of the shroud 51 on the outer circumference side in the radius direction R includes bottom faces 4 and a step portion 3 formed to have a step face 5 that protrudes toward the outer circumference side in the radius direction R further than the bottom faces 4.

On the casing base face 13, three seal fins 6A, 6B, and 6C are provided so as to extend toward the inner circumference side in the radius direction R (not appear in FIG. 1). Hereinafter, the seal fins 6A, 6B, and 6C are represented by the seal fin 6 if not discriminated from one another. The seal fin 6 takes an annular shape having a center corresponding to the axis line CL (see FIG. 1) and has a transversal sectional shape (the shape of a section perpendicular to the circumference direction) illustrated in FIG. 2 uniformly along the entire circumference.

The seal fin 6A disposed on the upstream side protrudes toward the bottom face 4 on the upstream side with respect to the step portion 3; the seal fin 6B disposed in the middle protrudes toward the step face 5 of the step portion 3; and the seal fin 6C disposed on the downstream side protrudes toward the bottom face 4 on the downstream side with respect to the step portion 3. The middle seal fin 6B is formed to have a length in the radius direction R shorter than those of the seal fin 6A on the upstream side and the seal fin 6C on the downstream side.

Each seal fin 6 forms a minute clearance m between the seal fin 6 and the shroud 51 in the radius direction R. The dimensions of the minute clearances m are set within the range in which the seal fin 6 is not in contact with rotating vanes 50, considering the thermal expansion amounts of the casing 10 and the rotating vane 50, and the centrifugal elongation amount of the rotating vane 50.

In the gap Gd, an upstream cavity 25 and a downstream cavity 26 are defined by the annular groove 12, the shroud 51, and the seal fin 6. The positions of the seal fin 6 in the axis line direction are appropriately set according to the behavior of the flow of the leak steam SL that leaked into the cavities 25 and 26.

2-2. Seal Fin

The seal fin 6 is largely characterized by the structure of the tip directing the bottom faces 4 and the step face 5 of the shroud 51. Description will now be made in relation to the structure of the tip with reference to FIGS. 3-5.

Figure 3:
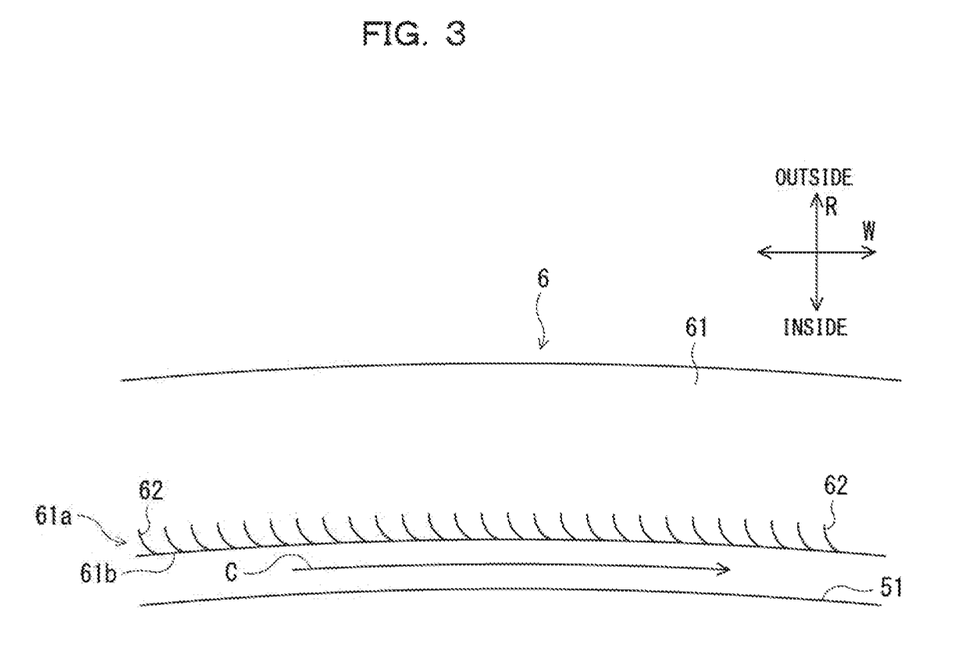
FIG. 3 is a schematic front view (seen from the upstream side) illustrating the configuration of a seal fin according to an embodiment of the present invention.

As illustrated in FIG. 3, the seal fin 6 consists of a fin main body 61 that extends inward from the casing base face 13 (see FIG. 2) along the radius direction R and multiple wing-shaped hollows 62 disposed on an inner-circumference edge portion 61a of the fin main body 61. The hollows 62 open at the inner-circumference edge 61b of the fin main body 61 and are arranged along the entire circumference of the fin main body 61 at intervals along the circumference direction. In other words, the inner-circumference edge portion 61a of the fin main body 61 is formed by alternately arranging, along the circumference direction, thick portions having a large thickness in the axis direction A and thin portions having a small thickness in the axis direction A.

FIG. 3 schematically illustrates the hollows 62 by curved lines not having a thickness.

Figure 4A:
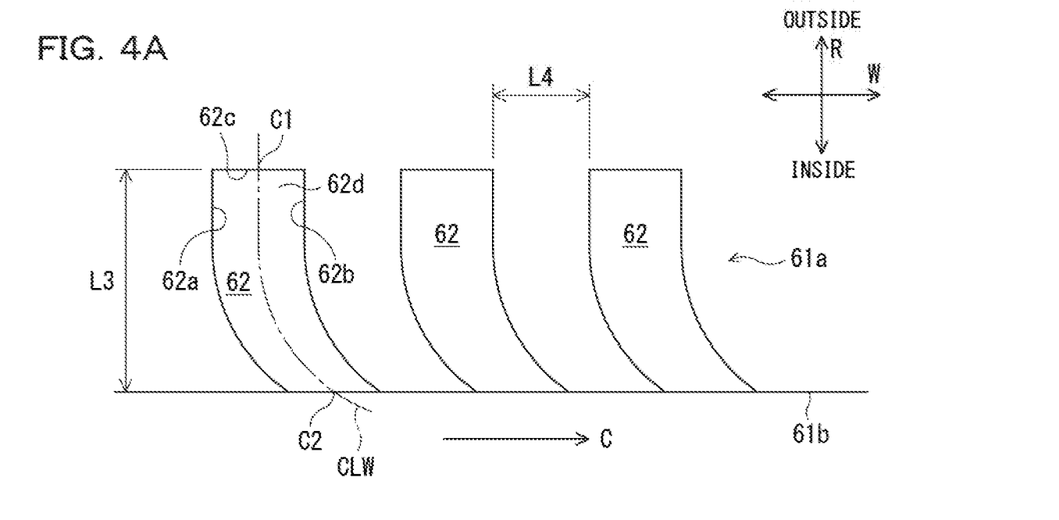
Figure 4B:
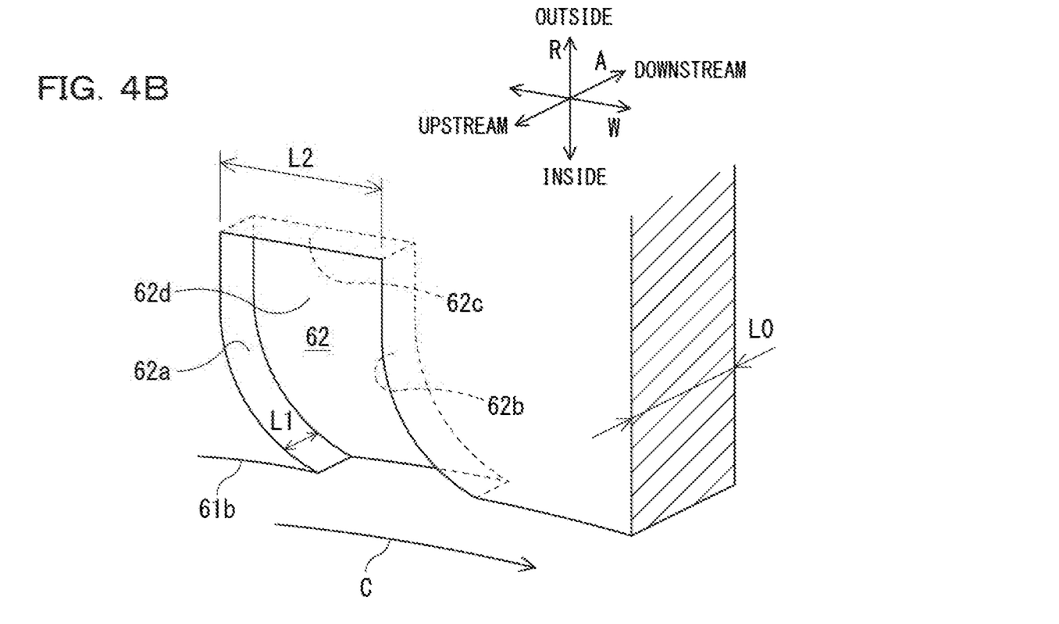

As illustrated in FIGS. 4A and 4B, each hollow 62 is formed of curved side walls 62a and 62b facing each other and being spaced apart in the circumference direction, an outer-circumference wall 62c that connects outer-circumference edges of the side walls 62a and 62b, and a bottom wall 62d that extends along the radius direction R. The bottom wall 62d is defined as a face connecting the downstream ends of the side walls 62a, 62b, and the outer-circumference wall 62c.

The hollows 62 are formed into a curved shape that comes to be a posture following along the rotating direction C of the shroud 51 as approaching the inner-circumference edge (tip on the extending direction) 61b of the fin body 61, and also have a transversal section (a section perpendicular to the flow of the leak steam SL in the hollows 62) formed into a tapered shape as approaching the inner-circumference edge 61b.

Generally, the leak steam SL flowing toward the seal fin is accelerated as approaching the tip (inner-circumference edge, hereinafter also referred to as a fin tip) of the seal fin and reaches the maximum velocity at the fin tip. Having the hollows 62 in the shape described above, the seal fin 6 of the present embodiment further accelerates the flow of the leak steam SL at the fin tip by turning the flow by the hollows 62, so that the hydrostatic pressure of the upstream side of the seal fin 6 is lowered and consequently the flow amount (hereinafter referred to as a leak flow amount) FL of the leak steam SL can be reduced.

Acceleration of the flow of the leak steam SL by the hollows 62 is achieved by the curbed shape as well as the tapered shape, which let the leak steam SL flowing along the curved shape lean to the outer circumference side of the curved shapes in the hollows 62 by the action of the centrifuge force, and consequently the leak steam SL is constricted.

For the convenience, FIG. 4A illustrates the arc shape of the inner-circumference edge 61b of the fin main body 61 with a straight line.

Here, the principal dimensions L1, L2, L3, and L4 of the hollows 62 will now be described.

The length L1 represents a dimension (hereinafter referred to as a "depth dimension") of the side walls 62a and 62b defining the hollow 62 along the axis direction A.

The dimension L2 represents a dimension (hereinafter referred to as a width direction) of the outer-circumference walls 62c that define the hollows 62 along the width direction (the direction orthogonal to the radius direction R) W.

The dimension L3 represents a dimension (hereinafter referred to as a height dimension) of the hollows 62 along the radius direction R. In detail, the height dimension of the hollows 62 is the distance between the intersections C1 and C2 in the radius direction R in the front view (the view from the upstream side) illustrated in FIG. 4. The intersection C1 corresponds to the intersection of the outer-circumference wall 62c and the center line CLW along the width direction W of the bottom wall 62d. The intersection C2 is the intersection of the center line CLW and the inner-circumference edge 61b of the hollow 62.

The dimension L4 represents the distance, along the width direction W, between the outer-circumference edges of two hollows 62 adjacent in the circumference direction (i.e., the distance along the width direction W between the outer-circumference walls 62c that define the hollows 62).

The preferable ranges of L1, L2, L3, and L4 are found by analysis and are defined by serving the dimension L0 (hereinafter referred to as the thickness dimension) of the thick portion (a portion at which the hollow 62 is not formed) of the fin body 61 along the axis direction A as the standard dimension. The preferable range of the depth dimension L1 is 0.8 times the thickness dimension L0 or less (L1≤0.8×L0); the preferable range of the width dimension L2 is ten times the thickness dimension L0 or less (L2≤10×L0); and the preferable range of the height dimension L3 is 20 times the thickness dimension L0 or less (L3≤20×L0); and the preferable range of the dimension L4 is 100 times the thickness dimension L0 or less (L4≤100×L0).

The above ranges are determined for the following reason.

As described above, having the hollows 62, the seal fin 6 accelerates the flow of the leak steam SL at the fin tip by turning the flow by the hollows 62, so that the hydrostatic pressure on the upstream side of the seal fin 6 is lowered and consequently, the leak flow amount FL is intended to be reduced.

If the dimension L1 is larger than 0.8 times the thickness dimension L0 (L1>0.8×L0), a large dead water region is generated in each of the axis-direction space (i.e., along the axis direction A) within the hollow 62, so that the flow of the leak steam SL is not sufficiently turned in the hollows 62. If the dimension L1 is 0.8 times the thickness dimension L0 or less (L≤0.8×L0), the large dead water region is not generated within each of the hollows 62 and the flow of the leak steam SL is efficiently turned in the hollows 62, so that the flow of the leak steam SL can be sufficiently accelerated, resulting in lowering the hydrostatic pressure on the upstream side of the fin.

If the dimension L2 is 10 times the thickness dimension L0 or less (L2≤10×L0), the flow of the leak steam SL is effectively turned in the hollows 62 and can be effectively accelerated, resulting in lowering the hydrostatic pressure on the upstream side of the seal fin 6. On the contrary, if the dimension L2 exceeds ten times the thickness dimension L0 (L2>10×L0), the hollows 62 fail to sufficiently turn the flow of the leak steam SL.

If the height dimension L3 is 20 times the thickness dimension L0 or less (L3≤20×L0), the flow of the leak steam SL is sharply turned in the hollows 62 and is effectively accelerated, resulting in lowering the hydrostatic pressure on the upstream side of the seal fin 6.

If the dimension L4 is 100 times the thickness dimension L0 or less (L4≤100×L0), the flow of the leak stream SL which has been turned by the hollows 62 acts on the ambient leak steam SL not having passed the hollows 62, and consequently the ambient leak steam SL is also turned. This increases the amount of leak steam SL that is accelerated by being turned, so that the hydrostatic pressure can be lowered uniformly in the circumference direction.

3. Effects and Advantages

Description will now be made in relation to the effects and advantages of the seal fin 6, the seal structure 2, and the steam turbine 1 according to one embodiment of the present invention with reference to FIGS. 2 and 5.

As illustrated in FIG. 2, the flow of the leak steam SL is contracted in the radius direction R due to the presence of the seal fin 6 and is consequently inhibited from passing (i.e., leaking) through the minute clearance m between the seal fin 6 and the shroud 51. Furthermore, as illustrated in FIG. 5, according to the seal structure 2 and the seal fin 6 according to one embodiment of the present invention, the flow of the leak steam SL that has been contracted and then flown to the inner-circumference edge portion 61a comes to flow in the circumference direction along the shape (the shape curved in the circumference direction) of the hollows 62. Consequently, since the velocity component of the flow of the leak steam SL in the axis direction A (i.e., the velocity component directing to the minute clearance m) is converted into the velocity component in the circumference direction, the flow of the leak steam SL to pass through the minute clearance m is weakened, so that the flow amount FL of the leak steam SL passing through the minute clearance m can be suppressed (i.e., a high leak-suppressing effect can be obtained).

Since the posture of the curved shape of the hollows 62 follows along the rotating direction C of the rotating shaft 30 as approaching the inner-circumference edge portion 61a (i.e., as flowing downstream along the flow direction of the leak steam SL in the hollows 62), the leak steam SL flowing out of the hollows 62 comes to flow in the rotating direction C of the rotating shaft 30. This suppresses the friction between the leak steam SL and the shroud 51 and consequently suppresses lowering of the turbine efficiency due to the friction loss.

Figure 5:
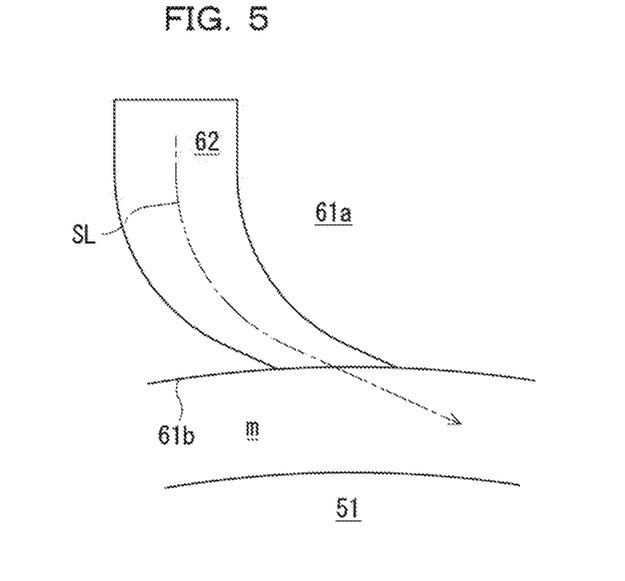
FIG. 5 is a front view schematically illustrating effects of a hollow of the seal fin according to an embodiment of the present invention.

Furthermore, since the hollows 62 have a tapered transversal section (i.e., the section perpendicular to the flow of the leak steam SL indicated by an arrow of the one-dotted line in FIG. 5) that narrows as approaching the inner-circumference edge 61b, the leak steam SL is accelerated while passing the hollows 62 and consequently the hydrostatic pressure is lowered.

This further efficiently suppresses the leak flow amount FL that passes through the minute clearance m (i.e., obtaining a further higher leak-suppressing effect).

Furthermore, setting the principal dimensions L1, L2, L3, and L4 of the hollows 62 to respective preferable ranges ensures a further higher leak-suppressing effect.

Using such a seal fin 6 having a high leak-suppressing effect suppresses the leak loss of the steam turbine 1 and ensures high turbine efficiency.

A thinner thickness dimension (i.e., dimension along the axis direction A) of the inner-circumference edge portion 61a of the seal fin 6 provides higher seal suppressing effect.

This is because, if the thickness dimension is large, the contracted flow of the leak steam SL diffuses on the downstream side while passing through the minute clearance m and adheres to the base face of the seal fin 6 again. Since providing the hollows 62 on the inner-circumference edge portion 61a of the seal fin 6 corresponds to forming thin portions on the inner-circumference edge portion 61a, so that this structure further enhances the leak-suppressing effect.

4. Miscellaneous (1) The shape of the hollows 62 formed on the seal fin 6 is not limited to that of the foregoing embodiment. Alternatively, the seal fin 6 illustrated in FIG. 3 may use hollows 62A, 62B respectively illustrated in FIGS. 6A, 6B in place of the hollows 62. For the convenience, FIGS. 6A and 6B illustrate the arc shapes of the inner-circumference edge 61b of the fin main body 61 with straight lines.

Figure 6A:
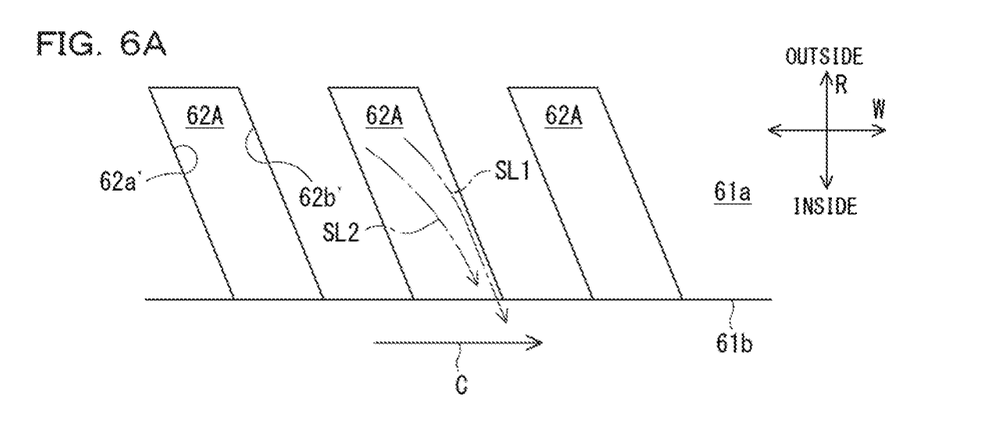
FIGS. 6A and 6B are schematic front views illustrating modifications of hollows of the seal fin according to an embodiment of the present invention.
Figure 6B:
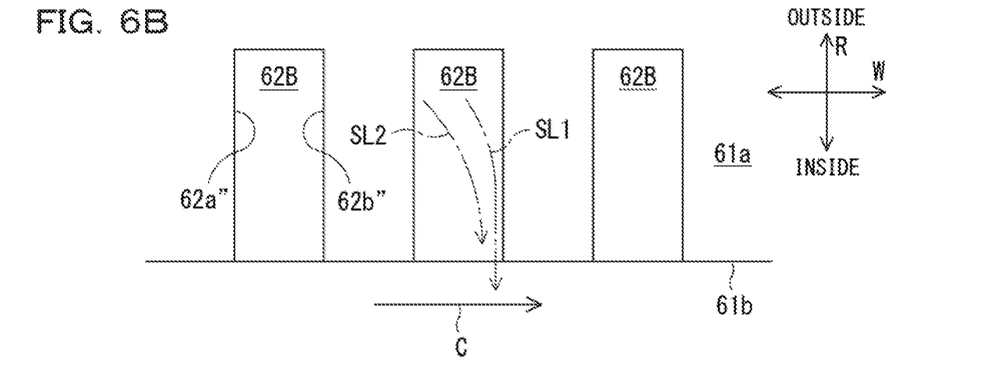

The hollows 62A shown in FIG. 6A are formed so as to be inclined toward the downstream side in the rotating direction C of the rotating shaft 30 (see FIG. 1) as approaching the inner-circumference edge 61b of the fin main body 61. Differently from the hollows 62 of the above embodiment (see FIGS. 4A and 4B), the both side walls 62a' and 62b' that define the hollows 62A are in straight shapes.

Also with this structure, since the velocity component of the flow of the leak steam SL1 and SL2 directing to the axis direction A is guided by the hollows 62A and converted into the velocity component in the circumference direction, the flow of the leak steam SL in the axis direction A about to pass through the minute clearance m is weakened, so that a high leak-suppressing effect can be obtained.

Although the hollows 62A are different from the hollows 62 and are not in the tapered form, the leak steam SL is provided with whirl force in the direction that drives and rotates the rotating vanes 50 (see FIG. 2) in the rotating direction C when passing through the stationary vanes 40 (see FIGS. 1 and 2). Consequently, as illustrated by the arrow of the one-dotted line in FIG. 6A, the leak steam SL1 and SL2 flows while leaning to the outer circumference side of the whirl direction within the hollows 62A by the action of the centrifuge force, and is consequently constricted. Accordingly, the leak steam SL1 and SL2 is accelerated to lower the hydrostatic pressure, and the leak-suppressing effect can be obtained due to the constriction likewise the case using the hollow 62 of the above embodiment.

Furthermore, since the hollows 62A are formed in such a posture of being inclined toward the downstream side in the rotating direction C of the rotating shaft (see FIG. 1) as approaching the inner-circumference edge 61b of the fin main body 61, the leak steam SL1 and SL2 flowing out of the hollows 62A contain velocity components directing toward the rotating direction C. Accordingly, the friction against the shroud 51 (see FIG. 2) can be suppressed.

The hollows 62B shown in FIG. 6(b) have the both side walls 62a" and 62b" that define the hollows 62B and that are formed in shapes extending along the radius direction R, and are generally in straight shapes extending along the radius direction R.

With this configuration, likewise the case using the hollows 62A illustrated in FIG. 6A, the leak steam SL1 and SL2, which is provided with the whirl force by the rotating vanes, flows while leaning to the outer circumference side of the whirl direction, and is consequently constricted to bring the leak-suppressing effect.

Also in the configurations shown in FIGS. 6A and 6B, providing the hollows 62A and 62B corresponds to forming thin portions on the inner-circumference edge portions 61a of the seal fins 6, so that a leak-suppressing effect due to the presence of the thin portions can be obtained.

The leak steam provided with the whirl force by the rotating vanes, that is, the leak steam having the velocity component in the circumference direction, collides with the side walls 62a, 62a', 62b', and 62b that crosses the circumference direction and is consequently weakened, so that from this aspect also, the leak-suppressing effect can be obtained.

Alternatively, the hollows 62A and 62B may be formed to be tapered, or the hollows 62A may be inclined in the opposite direction to that of FIG. 6A (inclined toward the upstream side in the rotating direction C as approaching the inner-circumference edge 61b).

(2) In the above embodiment, the seal structure of the present invention is applied to the seal structure between the casing 10 and the rotating vanes 50, but alternatively may be applied to the seal structure between the shaft main body 31 and the stationary vanes 40.

(3) The above embodiment uses a step-type shroud 51, but alternatively a straight-through-type shroud may be used.

(4) In the above embodiment, the hollows 62 are provided to all the seal fins 6A, 6B, and 6C. Alternatively, it is satisfactory that at least one of the seal fins 6A, 6B, and 6C is provided with the hollows 62.

Further alternatively, the seal fins 6A, 6B, and 6C may be provided with hollows having different shapes. For example, the seal fins 6A, 6B, and 6C may be provided with the hollows 62, 62A, and 62B, respectively.

Otherwise, the hollows 62, 62A, and 62B may be mixedly included in a single seal fin 6.

(5) The above embodiment describes an example that the present invention is applied to a steam turbine. Alternatively, the present invention can be applied to the seal of a turbo machine, i.e., a gas turbine or a turbo compressor, except for a steam turbine. Furthermore, the present invention can be applied to a seal between two structures that relatively rotate in a machine (such as a rotary joint) except for the turbo machine.

EXPLANATION OF REFERENCE SIGNS

1: steam turbine (turbo machine)
2: seal structure
3: step portion
4: bottom face
5: step face
6,6A,6B,6C: seal fin
10: casing (first structure)
12: annular groove
13: base face
25,26: cavity
30: rotating axis
31: shaft main body
40: stationary vane
50: rotating vane
51: shroud (second structure)
61: fin main body
61a: inner-circumference edge portion of fin main body 61
61b: inner-circumference edge of fin main body 61
62,62A,62B: hollow
6A,62a",62b,62b': side wall defining hollow
62c: outer-circumference wall defining hollow 62
62d: bottom wall defining hollow 62

A: axis direction
C: rotating direction of rotating shaft 30
CL: axis line
Gd: gap
L0: thickness dimension of fin main body 61
L1: depth dimension of hollow 62
L2: width dimension of hollow 62
L3: length dimension of hollow 62
L4: distance between adjacent hollows 62
m: minute clearance (clearance)
R: radius direction
S: steam (fluid)
SL: leak steam
W: width direction

What is claimed is:

1. A seal fin that suppresses leak of a fluid from a gap between a first structure being in a static state and a second structure rotating around an axis line and that is formed on the first structure so as to extend in a radius direction toward the second structure while keeping a clearance between a tip face thereof on an extending direction and the second structure, the first structure and the second structure facing each other in the radius direction with the gap in between, the seal fin comprising:
   a plurality of hollows opening at an inner radial edge along a circumference direction in parallel with each other on a front face facing an upstream side of a flow direction of the fluid, wherein the hollows are formed into a curved shape following along the circumference direction as approaching the inner radial edge of the seal fin.

2. A seal fin that suppresses leak of a fluid from a gap between a first structure being in a static state and a second structure rotating around an axis line and that is formed on the first structure so as to extend in a radius direction toward the second structure while keeping a clearance between a tip face thereof on an extending direction and the second structure, the first structure and the second structure facing each other in the radius direction with the gap inbetween, the seal fin comprising:
   a plurality of hollows opening at an inner radial edge on the extending direction and being arranged along a circumference direction in parallel with each other on a front face facing an upstream side of a flow direction of the fluid, wherein
   the hollows are formed so as to be inclined with respect to the radius direction.

3. The seal fin according to claim 2, wherein the hollows are inclined toward a downstream side of a rotating direction of the second structure as approaching the inner radial edge.

4. The seal fin according to claim 1, wherein the hollows have a transversal section perpendicular to a flow direction of the fluid flowing in the hollows, the transversal section being formed into a tapered shape that narrows as approaching the inner radial edge.

5. The seal fin according to claim 1, wherein:
   a thickness dimension of the seal fin along the axis line at a portion not having the hollows is regarded as a standard dimension;
   a depth dimension of the hollows along the axis line is set to be 0.8 times the standard dimension or less;
   a dimension of the hollows along a width-direction at an edge on an outer side of the radius direction is set to be 10 times the standard dimension or less, the width-direction being orthogonal to the radius direction;
   a height dimension of the hollows along the radius direction is set to be 20 times the standard dimension or less; and
   a distance between the hollows adjacent to each other in the circumference direction is set to be 100 times the standard dimension or less.

6. A seal structure that suppresses leak of a fluid from a gap between a first structure being in a static state and a second structure rotating around an axis line, the first structure and the second structure facing each other in a radius direction with the gap inbetween, the seal structure comprising:
   the seal fin being defined in claim 1 and being formed on the first structure so as to extend toward the second structure while keeping a clearance between a tip face thereof on an extending direction and the second structure.

7. A turbo machine comprising the seal structure defined in claim 6.

8. The seal fin according to claim 1, wherein the hollows have a transversal section perpendicular to a flow direction of the fluid flowing in the hollows, the transversal section being formed into a tapered shape that narrows as approaching the inner radial edge.

9. The seal fin according to claim 2, wherein the hollows have a transversal section perpendicular to a flow direction of the fluid flowing in the hollows, the transversal section being formed into a tapered shape that narrows as approaching the inner radial edge.

10. The seal fin according to claim 3, wherein the hollows have a transversal section perpendicular to a flow direction of the fluid flowing in the hollows, the transversal section being formed into a tapered shape that narrows as approaching the inner radial edge.

11. The seal fin according to claim 2, wherein:
    a thickness dimension of the seal fin along the axis line at a portion not having the hollows is regarded as a standard dimension;
    a depth dimension of the hollows along the axis line is set to be 0.8 times the standard dimension or less;
    a dimension of the hollows along a width-direction at an edge on an outer side of the radius direction is set to be 10 times the standard dimension or less, the width-direction being orthogonal to the radius direction;
    a height dimension of the hollows along the radius direction is set to be 20 times the standard dimension or less; and
    a distance between the hollows adjacent to each other in the circumference direction is set to be 100 times the standard dimension or less.

12. A seal structure that suppresses leak of a fluid from a gap between a first structure being in a static state and a second structure rotating around an axis line, the first structure and the second structure facing each other in a radius direction with the gap inbetween, the seal structure comprising:
    the seal fin being defined in claim 2 and being formed on the first structure so as to extend toward the second structure while keeping a clearance between a tip face thereof on an extending direction and the second structure.

13. A turbo machine comprising the seal structure defined in claim 12.

* * * * *